United States Patent
Franz et al.

(10) Patent No.: US 10,866,479 B2
(45) Date of Patent: *Dec. 15, 2020

(54) ULTRATHIN, SOLUTION PHASE ELECTROCHROMIC DEVICES

(71) Applicant: GENTEX CORPORATION, Zeeland, MI (US)

(72) Inventors: Sue F. Franz, Zeeland, MI (US); Kelvin L. Baumann, Zeeland, MI (US); Adam R. Heintzelman, Zeeland, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/192,735

(22) Filed: Nov. 15, 2018

(65) Prior Publication Data

US 2019/0086759 A1 Mar. 21, 2019

Related U.S. Application Data

(63) Continuation of application No. 15/668,060, filed on Aug. 3, 2017, now abandoned.

(Continued)

(51) Int. Cl.

| | | |
|---|---|---|
| *G02F 1/153* | (2006.01) | |
| *G02F 1/161* | (2006.01) | |
| *G02F 1/157* | (2006.01) | |
| *G02F 1/1516* | (2019.01) | |
| *G02F 1/1514* | (2019.01) | |
| *G02F 1/1503* | (2019.01) | |

(Continued)

(52) U.S. Cl.
CPC ............ *G02F 1/1533* (2013.01); *G02F 1/157* (2013.01); *G02F 1/161* (2013.01); *G02F 1/163* (2013.01); *G02F 1/1503* (2019.01); *G02F 1/15165* (2019.01); *G02F 2001/1502* (2013.01); *G02F 2001/1517* (2013.01); *G02F 2001/1518* (2019.01); *G02F 2001/15145* (2019.01)

(58) Field of Classification Search
CPC .......... G02F 1/15; G02F 1/161; C07D 213/22
See application file for complete search history.

(56) References Cited

U.S. PATENT DOCUMENTS

| | | | | |
|---|---|---|---|---|
| 4,841,058 A | * | 6/1989 | Endo | .................... C07D 213/22 546/257 |
| 5,294,376 A | * | 3/1994 | Byker | .................. C07D 213/22 252/600 |

(Continued)

FOREIGN PATENT DOCUMENTS

| | | |
|---|---|---|
| JP | 2002-072255 A | 3/2002 |
| JP | 2005-517978 A | 6/2005 |
| WO | WO-2016/022415 A1 | 2/2016 |

OTHER PUBLICATIONS

Supplementary European Search Report re Application No. EP17837691 dated May 28, 2019; 9 pages.

(Continued)

*Primary Examiner* — Zachary W Wilkes

(74) *Attorney, Agent, or Firm* — Foley & Lardner LLP; Bradley D. Johnson

(57) ABSTRACT

An electrochromic device includes an electrochromic medium including a cathodic component, an anodic component, a hydroquinone, and a solvent.

20 Claims, 3 Drawing Sheets

Related U.S. Application Data

(60) Provisional application No. 62/371,495, filed on Aug. 5, 2016.

(51) Int. Cl.
*G02F 1/15* (2019.01)
*G02F 1/163* (2006.01)

(56) References Cited

U.S. PATENT DOCUMENTS

| | | | |
|---|---|---|---|
| 5,679,283 A | 10/1997 | Tonar et al. | |
| 6,433,914 B1 | 8/2002 | Lomprey et al. | |
| 6,561,460 B2 | 5/2003 | Rukavina et al. | |
| 6,710,906 B2 | 3/2004 | Guarr | |
| 6,867,894 B2 | 3/2005 | Asano | |
| 7,106,489 B2 * | 9/2006 | Berneth | G02F 1/1503 359/273 |
| 7,450,291 B2 | 11/2008 | Guarr et al. | |
| 9,726,957 B2 | 8/2017 | Telfer et al. | |
| 9,939,701 B2 * | 4/2018 | Baumann | G02F 1/15 |
| 10,040,763 B2 * | 8/2018 | Lin | C08G 18/3293 |
| 2013/0182308 A1 * | 7/2013 | Guarr | G02F 1/1506 359/275 |
| 2015/0084024 A1 * | 3/2015 | Cammenga | G02F 1/161 257/40 |
| 2015/0355519 A1 * | 12/2015 | Vasiliev | B29D 11/00634 359/266 |
| 2016/0282694 A1 * | 9/2016 | Biver | C09K 9/02 |

OTHER PUBLICATIONS

Notice of Reasons for Refusal issued on JP 2019-506432 dated Feb. 25, 2020, 10 pages with English Translation.

* cited by examiner

US 10,866,479 B2

ULTRATHIN, SOLUTION PHASE ELECTROCHROMIC DEVICES

CROSS-REFERENCE TO RELATED APPLICATIONS

This application is a continuation of U.S. patent application Ser. No. 15/668,060 filed on Aug. 3, 2017, which in turn claims the benefit of U.S. Provisional Patent Application No. 62/371,495, filed on Aug. 5, 2016, the contents of both of which are incorporated herein by reference in their entirety for any and all purposes.

FIELD

The present technology is generally related to electrochromic devices. More particularly, it is related to ultrathin solution phase electrochromic devices.

SUMMARY

In one aspect, an electrochromic device is provided including a chamber defined by a substantially transparent first substrate, a second substrate, and a sealing member; wherein: the first substrate comprises a first surface, and a second surface comprising a first substantially transparent, electrically conductive coating and disposed opposite to the first surface; the second substrate comprising a first surface comprising an electrically conductive coating, and a second surface disposed opposite to the first surface; the second surface of the first, with its conductive coating, and the first surface of the second substrate, with its conductive coating, being located proximally to each other and having a substantially uniform spacing of distance, d, between them; and $0\ \mu m < d \leq 65\ \mu m$; an electrochromic medium comprising a cathodic component, an anodic component, and a solvent; and insoluble spacing objects within the chamber, the insoluble spacing objects having a largest dimension that is greater than 0, but less than or equal to d.

DETAILED DESCRIPTION

Figure 1:
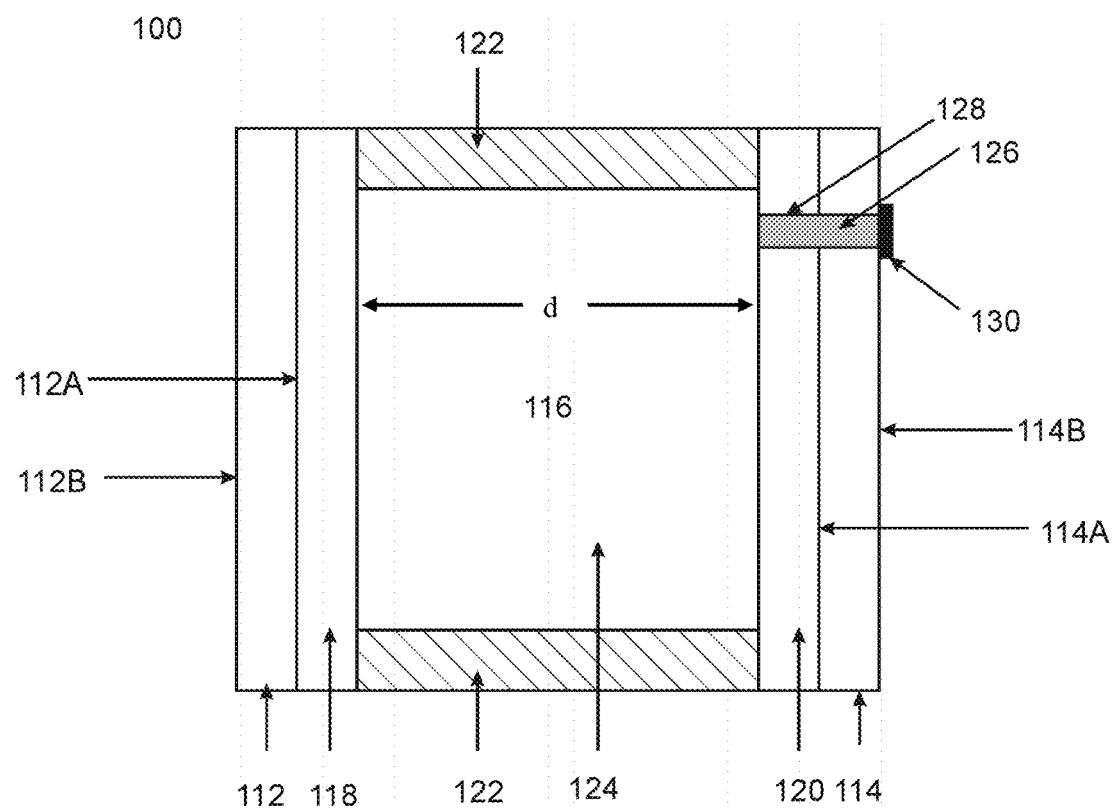
FIG. 1 is a cross-sectional schematic representation of an electrochromic device, according to one embodiment.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, $CH-CH=CH_2$, $C=CH_2$, or $C=CHCH_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Electrochromic, solution phase devices are provided having a narrow cell spacing dimension that is less than 65 µm, and for which collapse of the cell spacing is prevented by non-dissolving, in-view spacing objects. The non-dissolving, in-view spacing objects are minimally, or are not, visible to the naked eye when the electrochromic device is in the low- and high-transmission states, or when the electrochromic device is in a transitioning state between the low- and high-transmission states, and the in-view spacing objects do not detract from the aesthetic appearance of the device. Further, the narrow cell spacing provides for faster coloring and clearing times in the devices.

As used herein, the term "in-view" is intended to refer to the use of the spacing objects in the field of view of the electrochromic device. For example, where the device is a mirror, the spacing objects are in the viewing field of the mirror, or where the device is a window, the spacing objects are in the viewing field of the window. By reference to the naked eye, it will be appreciated that under normal, unaided viewing of the device a person will not detect, or will not perceive any detraction from, the spacing objects. If the spacing objects are of such small dimensions that they are not visible under normal viewing, the objects may be colored, opaque, or colored and opaque. Where the spacing objects are of a dimension that may be otherwise detected by the naked eye, they may be made of a colorless, a transparent, or both a colorless and transparent material.

Provided herein are electrochromic devices having a narrow cell spacing with in-view, insoluble spacing objects to prevent collapse of the cell during back filling of the electrochromic device, and which may assist in maintaining the cell spacing during normal use and operation of the device. The cell spacing is sufficiently small such that the insoluble beads are not readily observed and/or do not distract from the overall aesthetic appearance of the device in any transmission state of the device. Additionally, for thin substrates (e.g. 0.7 mm, 0.5 mm, 0.3 mm, or 0.003 mm glass or plastic, or any value or range in between such values), or for larger devices where sagging of a polymer gel within the medium may cause non-uniform cell spacing, in-view insoluble spacing objects may be used to maintain the cell spacing during filling or use of the device.

Accordingly, in one aspect, an electrochromic the device includes a chamber defined by a substantially transparent first substrate, a second substrate, and a sealing member, where a second surface of the first substrate, having a conductive coating thereon, proximal to a first surface of the second substrate, having a conductive coating thereon, are substantially uniformly spaced apart from one another by a distance, d. According to some embodiments, d is greater than 0 µm and less than or equal to 65 µm. This includes, but is not limited to the following d values: $0<d\leq60$ µm, $0<d\leq55$ µm, $0<d\leq45$ µm, $10<d\leq65$ µm, $10<d\leq55$ µm, and $10<d\leq45$ µm. Within the chamber are disposed insoluble spacing objects to maintain the separation of the substrates.

The insoluble spacing objects include a colorless material, a transparent material, or a colorless and transparent material. The insoluble spacing objects may be a ceramic, a polymer that is insoluble in the solvent, a glass, a metal oxide, an insoluble salt, or a non-conductive object. The insoluble spacing objects have a largest dimension that is greater than 0, but less than or equal to d. According to any of the embodiments, d may be from greater than 0 µm to less than or equal to 65 µm, from greater than 0 µm to less than or equal to 55 µm, from greater than 0 µm to less than or equal to 45 µm, from greater than 10 µm to less than or equal to 40 µm, from greater than 10 µm to less than or equal to 25 µm, from greater than 5 µm to less than or equal to 30 µm, from greater than 5 µm to less than or equal to 25 µm, or from greater than 5 µm to less than or equal to 20 µm. In some embodiments, d may be from greater than 10 µm to less than or equal to 35 µm, from greater than 20 µm to less than or equal to 40 µm, or about 30 µm. In any of the above embodiments, the insoluble spacing objects may be substantially transparent to the naked eye in the device, independent of the transmission state in which the device is poised. The shape of the insoluble spacing objects is not particlularly limited with the objects taking the form of beads, rods, cubes, and the like. In some embodiments, the objects are beads. The density, i.e. number of beads per square centimeter, of the beads in the cell may be regulated. Too few beads and the cell spacing may collapse, too many and a haze may be imparted to the device. The density of the beads is device-specific and may vary across a wide range. However, the density of beads may range from, in some embodiments, from 2 beads/cm$^2$ to 100 beads/cm$^2$. This may include, but is not limited to, 5 beads/cm$^2$ to 50 beads/cm$^2$, and 10 beads/cm$^2$ to 30 beads/cm$^2$.

The insoluble spacing objects may also have a refractive index that is closely matched to the refractive index of the electrochromic medium to minimize observation of the spacing objects with the naked eye. The refractive index of the bead may vary from the refractive index of the electrochromic medium by less than 20%, according to some embodiments. This may include a difference of less than 15%, less than 10%, less than 8%, or less than 5%. The refractive index of the objects may be modified using a variety of coatings on the object, or the refractive index of the medium may be modified to more closely match that of the objects.

The first substrate includes a first surface, and the second surface opposite to the first surface. The second surface includes a first substantially transparent, electrically conductive coating. The second substrate includes the first surface that has a electrically conductive coating, and is located opposite to a second surface. The electrically conductive coating of the second substrate may be a transparent, transflective, or reflective coating, or the second substrate may be a conductive material such as a metal.

Disposed within the chamber is an electrochromic medium. The medium includes a cathodic component, an anodic component, and a solvent. The anodic and cathodic components may exhibit slow diffusion throughout the electrochromic medium to allow for the small cell spacing devices (i.e. those having a value of d from greater than 0 μm to equal to or less than 65 μm, or as otherwise set forth above) to color to center without, or with only mimimal, irising of the device. As used herein, "irising" refers to the tendency of an electrochromic device under various conditions to color at the edges of the device to a greater extent that in the center of the device upon application of an electric field.

Typically both the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference, and the wavelength may be in the infrared, visible, or ultraviolet.

The electrochromic materials may include those having a low diffusion coefficient. Such materials exhibit lower mobility within the electrochromic medium. Illustrative, low diffusion coefficients may be from, but are not limited to, about $1 \times 10^{-6}$ to about $4 \times 10^{-6}$ cm/second$^2$. This may include from about $1 \times 10^{-6}$ to about $2 \times 10^{-6}$ cm/second$^2$. In addition to the cathodic and anodic materials described herein, other illustrative cathodic and anodic materials are generally and specifically described by U.S. Pat. Nos. 6,710,906 and 6,525,861, which are incorporated herein by reference.

Illustrative cathodic materials include reducible species. Illustrative cathodic materials may include, but are not limited to, viologen and metallocinium compounds. For example, illustrative viologens include, but are not limited to, those as described by Formula (I):

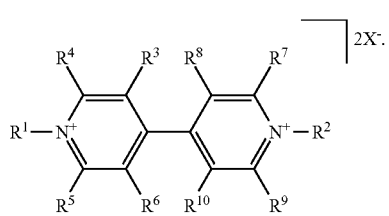

In Formula (I), $R^1$ and $R^2$ may be individually alkyl, siloxyalkyl, hydroxyalkyl, carboxyalkyl, phosphonylalkyl, alkenyl, or aralkyl; $R^4$, $R^6$, $R^8$, and $R^{10}$ may be individually H, $OR^{20}$, F, Cl, Br, I, CN, $NO_2$, alkyl, or aryl; $R^{20}$ is H or alkyl; and X is an anion. Also in Formula I, $R^3$, $R^5$, $R^7$, and $R^9$ may individually be H, $OR^{20}$, F, Cl, Br, I, CN, $NO_2$, alkyl, or aryl. In some embodiments, $R^1$ and/or $R^2$ are links to a polymer backbone, such that the viologen is tied into the polymer backbone, or $R^1$ and/or $R^2$ are bridging groups between other Formula (I) compounds. As discussed previously in defining the terms, the alkyl, siloxyalkyl, hydroxyalkyl, carboxyalkyl, phosphonylalkyl, alkenyl, or aralkyl of $R^1$ and $R^2$ may be substituted or unsubstituted. Substitution may include solubilizing groups such as ammonium groups, phosphonium groups, pyridinium groups, or other solubility enhancing groups as described in U.S. Pat. No. 6,445,486. When the $R^1$ and $R^2$ of Formula (I) are substituted with such solubilizing groups, it may be $R^4$, $R^6$, $R^8$, and $R^{10}$ are H. Any of $R^1$-$R^{10}$ may be substituted with ammoniumalkyl (-alkyl $[NR'_3]^+$), where each R' is individually selected from H or alkyl), phosphoniumalkyl (alkyl$[PR'_3]^+$), where each R' is individually selected from H, alkyl, or aryl), ether, or ester functionality to aid in achieving higher concentration cathodic materials in the electrochromic medium.

X is an anion that may be, but is not limited to, a halide, a borate, a fluoroborate, a tetraaryl borate, a hexafluoro metal or metalloid, a sulfate, a sulfonate, a sulfonamide, a carboxylate, a perchlorate, a tetrachloroferrate, or the like. Illustrative X groups include, but are not limited to: $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CN)_2^-$, $N(CF_3SO_2)_2^-$, $C(CF_3SO_2)_3^-$, $N(SO_2C_2F_5)_2^-$, $^-Al(OC(CF_3)_3)_4$ or $^-BAr_4$, wherein Ar is a aryl or fluorinated aryl group. In one embodiment, $X^-$ is $^-BAr_4$ and Ar is a pentafluorophenyl group. In some embodiments, X is a tetrafluoroborate or a bis(trifluoromethylsulfonyl) imide anion. When shown in any compound herein multiple X's may be a mixture of two or more such anions.

$R^1$ and $R^2$ may be individually a $C_1$-$C_{12}$ alkyl group that is substituted or unsubstituted, or which may be further connected to an aryl group, cyclic group, heterocyclic group, or heteroaryl group. In some embodiments, $R^1$ and $R^2$ are individually a $C_1$-$C_{12}$ alkyl group substituted with a silyloxy or a hydroxyl group at the end. In some embodiments, $R^1$ and $R^2$ are individually a hydroxyalkyl group. In some embodiments, $R^1$ is a hydroxypentanyl group. In some embodiments, $R^2$ is a hydroxyundecanyl group.

$R^4$, $R^6$, $R^8$, and $R^{10}$ may be individually H, OH, or alkyl. In some embodiments, $R^4$, $R^6$, $R^8$, and $R^{10}$ are individually H. In some embodiments, $R^4$, $R^6$, $R^8$, and $R^{10}$ are individually $C_1$-$C_6$ alkyl. In some embodiments, $R^4$, $R^6$, $R^8$, and $R^{10}$ are all H.

$R^3$, $R^5$, $R^7$, and $R^9$ may be individually H, alkyl, or aryl, with the proviso that $R^3$ and $R^5$, or $R^7$ and $R^9$, or $R^3$ and $R^5$ and $R^7$ and $R^9$ are individually secondary alkyl, tertiary alkyl, or aryl. In some embodiments, $R^3$, $R^5$, $R^7$, and $R^9$ are individually secondary or tertiary $C_3$-$C_{12}$ alkyl. In some embodiments, $R^3$, $R^5$, $R^7$, and $R^9$ are individually H or aryl. In some embodiments, $R^3$ and $R^5$ are individually secondary alkyl, tertiary alkyl, or aryl. In some embodiments, $R^3$ and $R^5$ are individually aryl. In some embodiments, $R^3$ and $R^5$ are aryl and $R^7$ and $R^9$ are H.

In the above embodiments, $R^3$, $R^5$, $R^7$, or $R^9$ may be an aryl group of Formula (II):

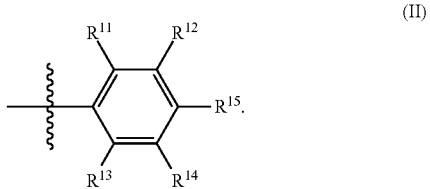

(II)

In Formula (II), $R^{11}$, $R^{12}$, $R^{13}$, and $R^{14}$ may be individually H, $OR^{20}$, F, Cl, Br, I, CN, $NO_2$, or alkyl; $R^{15}$ is H, OH, F, Cl, Br, I, CN, $NO_2$, —OC(O)$NR^{16}R^{17}$, alkyl, or alkoxy; $R^{16}$ is H or alkyl; $R^{20}$ is H or alkyl; and $R^{17}$ is H, alkyl or siloxy alkyl.

In some embodiments, in Formula (II), $R^{11}$, $R^{12}$, $R^{13}$, and $R^{14}$ may be individually H or alkyl. In some embodiments, $R^{11}$, $R^{12}$, $R^{13}$, and $R^{14}$ are individually H or $C_1$-$C_6$ alkyl. In some embodiments, $R^{11}$, $R^{12}$, $R^{13}$, and $R^{14}$ are all H. In some embodiments, $R^{15}$ is H, OH, alkyl, or alkoxy. In some embodiments, $R^{15}$ is $C_1$-$C_6$ alkyl. In some embodiments, $R^{15}$ is H, methyl, ethyl, propyl, iso-propyl, butyl, sec-butyl, or tert-butyl. In some embodiments, $R^{11}$, $R^{12}$, $R^{13}$, and $R^{14}$ are H, and $R^{15}$ is H, methyl, ethyl, propyl, iso-propyl, butyl, sec-butyl, or tert-butyl. In some embodiments, $R^{16}$ is H. In other embodiments, $R^{16}$ is $C_1$-$C_6$ alkyl. In some embodiments, $R^{17}$ is alkyl or siloxy alkyl. In some embodiments, $R^{17}$ is H, methyl, ethyl, propyl, iso-propyl, butyl, sec-butyl, tert-butyl, or —(CH$_2$)$_n$Si(OR$^{18}$)$_3$, $R^{18}$ H or alkyl, and n is 1 to 10.

Alternatively in Formula (I), $R^1$ and $R^2$ may be individually alkyl or hydroxyalkyl, and $R^3$ and $R^5$, or $R^7$ and $R^9$, may be individually an aryl of Formula (II). In some embodiments, $R^3$ and $R^5$ are an aryl group. In some embodiments, $R^7$ and $R^9$ are an aryl group. In some embodiments, $R^3$ and $R^5$, or $R^7$ and $R^9$, are a phenyl. In some embodiments, $R^3$, $R^5$, $R^3$ and $R^9$ are each an aryl group of Formula (II). In some embodiments, $R^{11}$, $R^{12}$, $R^{13}$, and $R^{14}$ are H, and $R^{15}$ is H, OH, alkyl or alkoxy. In some embodiments, $R^{11}$, $R^{12}$, $R^{13}$, and $R^{14}$ are H, and $R^{15}$ is H, OH, Me, or methoxy.

In one embodiment, for a compound of Formula (I), $R^1$ and $R^2$ are individually an alkyl group, and $R^3$ and $R^5$, or $R^7$ and $R^9$, are individually aryl of Formula (II). In some embodiments, $R^3$ and $R^5$, or $R^7$ and $R^9$, may be substituted phenyl. In some embodiments, $R^3$ and $R^5$, or $R^7$ and $R^9$, may be phenyl substituted with a carbamate group. In some embodiments, $R^3$ and $R^5$, is each an aryl of Formula (II). In other embodiments, $R^7$ and $R^9$, may each be an aryl of Formula (II). In some embodiments, $R^{11}$, $R^{12}$, $R^{13}$, and $R^{14}$ are H, and $R^{15}$ is —OC(O)$NR^{16}R^{17}$. In some embodiments, $R^{16}$ is H. In some embodiments, $R^{17}$ is alkyl or siloxy alkyl. In some embodiments, $R^{17}$ is —(CH$_2$)$_n$Si(OR$^{18}$)$_3$, $R^{18}$ H or alkyl, and n is 1 to 10. In some embodiments, $R^{17}$ is —(CH$_2$)$_n$Si(OR$^{18}$)$_3$, $R^{18}$ is methyl or ethyl, and n is 3.

In one aspect, the viologen is represented by Formula (III)

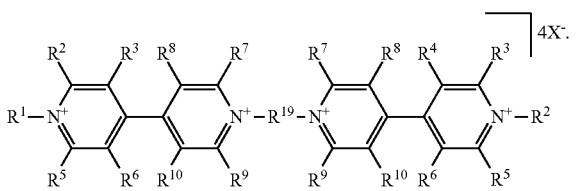

(III)

In Formula (III), $R^{19}$ is (CH$_2$)$_{n'}$ or arylene, and n' is from 1 to 12.

For compounds of Formula (III), $R^1$-$R^{10}$, and X are as defined herein for Formula (I). In some embodiments, $R^{19}$ is (CH$_2$)$_{n'}$, wherein n' is from 1-10. In some embodiments, $R^{19}$ is (CH$_2$)$_{3-8}$. In other embodiments, $R^{19}$ is phenylene. In some embodiments, $R^{19}$ is 1,4-phenylene.

Alternatively in Formula (III), $R^1$ and $R^2$ may be individually alkyl or hydroxyalkyl, and $R^3$ and $R^5$, or $R^7$ and $R^9$, may be individually an aryl of Formula (II). In some embodiments, $R^3$ and $R^5$ are an aryl group. In some embodiments, $R^7$ and $R^9$ are an aryl group. In some embodiments, $R^{11}$, $R^{12}$, $R^{13}$, and $R^{14}$ are H, and $R^{15}$ is H, OH, alkyl, or alkoxy. In some embodiments, $R^{11}$, $R^{12}$, $R^{13}$, and $R^{14}$ are H, and $R^{15}$ is methyl. In some embodiments, $R^{11}$, $R^{12}$, $R^{13}$, and $R^{14}$ are H, and $R^{15}$ is H, OH, Me, or methoxy. In some embodiments, $R^{19}$ is (CH$_2$)$_{n'}$, wherein n' is from 1-10. In some embodiments, $R^{19}$ is 1,4-phenylene.

In some embodiments, for a compound of Formula (III), $R^1$ and $R^2$ are individually methyl, $R^3$ and $R^5$ are each an aryl of Formula (II), $R^{11}$, $R^{12}$, $R^{13}$, and $R^{14}$ are H, $R^{15}$ is H, OH, Me, or methoxy, and $R^{19}$ is (CH$_2$)$_{n'}$, wherein n' is from 1-10.

In some embodiments, for a compound of Formula (III), $R^1$ and $R^2$ are individually alkyl or hydroxyalkyl, $R^7$ and $R^9$ are each an aryl of Formula (II), $R^{11}$, $R^{12}$, $R^{13}$, and $R^{14}$ are H, and $R^{15}$ is methyl, and $R^{19}$ is 1,4-phenylene.

In some embodiments, for a compound of Formula (III), $R^1$ and $R^2$ are individually alkyl or hydroxyalkyl, $R^7$ and $R^9$ are each an aryl of Formula (II), $R^{11}$, $R^{12}$, $R^{13}$, and $R^{14}$ are H, and $R^{15}$ is methyl, and $R^{19}$ is (CH$_2$)$_{n'}$, wherein n' is 3.

In another aspect, the viologen is represented by Formula (IV)

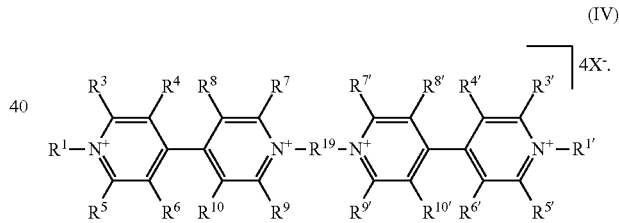

(IV)

In Formula (IV), $R^1$ and $R^{1'}$ may be individually alkyl, ammoniumalkyl, phosphoniumalkyl, siloxyalkyl, hydroxyalkyl, alkylcarboxylate, alkylphosphonate, alkylisocyanate, carboxylate, phosphonate, isocyanate, alkenyl, or aralkyl; $R^4$, $R^6$, $R^8$, $R^{10}$, $R^{4'}$, $R^{6'}$, $R^{8'}$, and $R^{10'}$ may be individually H, $OR^{20}$, F, Cl, Br, I, CN, $NO_2$, alkyl, or aryl; and $R^3$, $R^5$, $R^7$, $R^9$, $R^{3'}$, $R^{5'}$, $R^{7'}$, and $R^{9'}$ may be individually H, $OR^{20}$, F, Cl, Br, I, CN, $NO_2$, alkyl, or aryl, with the proviso that $R^3$, $R^5$, $R^{3'}$, and $R^{5'}$ are individually secondary alkyl, tertiary alkyl, or aryl; and $R^{19}$ is (CH$_2$)$_{n'}$ or arylene, $R^{20}$ is H or alkyl, and n' is from 1 to 12. X is an anion as defined above.

The compound of Formula (IV) includes where $R^1$ and $R^{1'}$ may be individually alkyl, siloxyalkyl, hydroxyalkyl, alkylcarboxylate, alkylphosphonate, alkylisocyanate, alkenyl, or aralkyl; $R^4$, $R^6$, $R^8$, $R^{10}$, $R^{4'}$, $R^{6'}$, $R^{8'}$, and $R^{10'}$ may be individually H, OH, F, Cl, Br, I, CN, $NO_2$, alkyl, or aryl; and $R^3$, $R^5$, $R^7$, $R^9$, $R^{3'}$, $R^{5'}$, $R^{7'}$, and $R^{9'}$ may be individually H, OH, F, Cl, Br, I, CN, $NO_2$, alkyl, or aryl, with the proviso that $R^7$, $R^9$, $R^{7'}$, and $R^{9'}$ are individually secondary alkyl, tertiary alkyl, or aryl; $R^{19}$ is (CH$_2$)$_{n'}$ or arylene, and n' is from 1 to 12. X is an anion as defined above.

In another aspect, the viologen is represented by Formula (V)

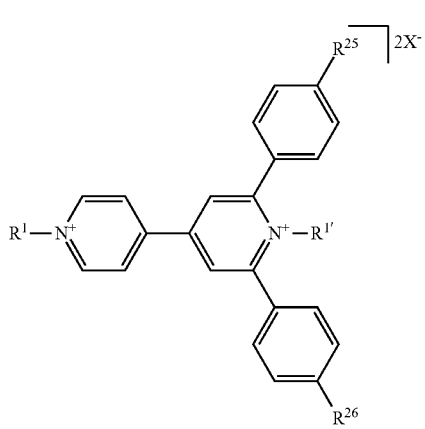

In Formula (V), $R^1$ and $R^{1'}$ are individually —$(CH_2)_n$OH, —$(CH_2)_n$Br, —$(CH_2)_n$Cl, —$(CH_2)_n$Si(OH)$_3$, —$(CH_2)_n$Si(OMe)$_3$, —$(CH_2)_n$Si(OEt)$_3$,

—$(CH_2)_n$CH=CH$_2$, —$(CH_2)_n$COC(O)CH=CH$_2$, or —$(CH_2)_n$COC(O)C(CH$_3$)=CH$_2$; $R^{25}$ and $R^{26}$ are individually H, Me, Et, Pr, OMe, OEt, OPr, OC(O)(CH$_2$)$_n$Si(OH)$_3$, OC(O)(CH$_2$)$_n$Si(OMe)$_3$, OC(O)NH(CH$_2$)$_n$Si(OEt)$_3$, OC(O)NH(CH$_2$)nCOOH, OC(O)NH(CH$_2$)$_n$P(O)(OH)$_2$, or OC(O)NH(CH$_2$)$_n$NCO; and n is 1 to 12.

In some embodiments, for compounds of Formula (V), $R^1$ and $R^{1'}$ are individually —$(CH_2)_n$OH, —$(CH_2)_n$Si(OH)$_3$, —$(CH_2)_n$Si(OMe)$_3$, —$(CH_2)_n$Si(OEt)$_3$,

—$(CH_2)_n$CH=CH$_2$, —$(CH_2)_n$COC(O)CH=CH$_2$, or —$(CH_2)_n$COC(O)C(CH$_3$)=CH$_2$. In some embodiments, for compounds of Formula (V), $R^1$ and $R^{1'}$ are each —$(CH_2)_n$OH, wherein n=1 to 15. In some embodiments, for compounds of Formula (V), $R^{25}$ and $R^{26}$ are each OC(O)NH(CH$_2$)$_n$Si(OEt)$_3$; and n is 1 to 12.

Illustrative anodic materials include oxidizable species. Illustrative anodic materials may include, but are not limited to, metallocenes, 5,10-dihydrophenazines, phenothiazines, phenoxazines, carbazoles, triphenodithiazines, triphendioxazines, and related compounds. Anodic materials included in the electrochromic medium may include any one of a number of materials including ferrocene, substituted ferrocenes, substituted ferrocenyl salts, phenazine, substituted phenazines, phenothiazine, substituted phenothiazines, including substituted dithiazines, thianthrene, and substituted thianthrenes. Examples of anodic materials may include di-tert-butyl-diethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP), bis(butyltriethylammonium)-para-methoxytriphenodithiazine (TPDT), and 3,10-dimethoxy-7,14-(triethylammoniumbutyl)-triphenodithazinebis (tetrafluoroborate). Any of the anodic materials may be substituted with alkylammonium (-alkyl[NR'$_3$]$^+$, where each R' is individually selected from H or alkyl), alkylphosphonium (-alkyl[PR'$_3$]$^+$, where each R' is individually selected from H, alkyl, or aryl), ether, or ester functionality to aid in achieving higher concentration anodic materials in the electrochromic medium. In some embodiments, the anodic material is substituted with alkylammonium or alkylphosphonium.

In some embodiments, a solvent of the electrochromic medium may include, but is not limited to, 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, γ-butyrolactone, γ-valerolactone; propylene carbonate (PC), ethylene carbonate; oligoethers; ionic liquids, such as pyridinium-, imidazolium-, and pyrrolidinium- compounds; and homogenous mixtures of any two or more such solvents. Where the solvent includes an ionic liquid, the counterion may be F$^-$, Cl$^-$, Br$^-$, I$^-$, BF$_4^-$, PF$_6^-$, SbF$_6^-$, AsF$_6^-$, ClO$_4^-$, SO$_3$CF$_3^-$, N(CN)$_2^-$, N(CF$_3$SO$_2$)$_2^-$, C(CF$_3$SO$_2$)$_3^-$, N(SO$_2$C$_2$F$_5$)$^-$, $^-$Al(OC(CF$_3$)$_3$)$_4$ or $^-$BAr$_4$ where Ar is a aryl or fluorinated aryl group, or other counterions used in ionic liquids. In one embodiment, the counterion$^-$ is $^-$BAr$_4$ and Ar is a pentafluorophenyl group. In another embodiment, the electrochromic composition may include a solvent that includes propylene carbonate. While specific solvents have been disclosed as being associated with the electrochromic composition, numerous other solvents that would be known to those having ordinary skill in the art having the present disclosure before them are likewise contemplated for use. For example, in addition to the solvent, the electrochromic medium may be a gel composition.

In addition, the electrochromic medium may include other materials, such as light absorbers, reducing compounds, light stabilizers, thermal stabilizers, antioxidants, oxygen scavengers, thickeners, viscosity modifiers, tint providing agents, redox buffers, and mixtures of any two or more such materials. Illustrative UV-stabilizers may include, but are not limited to, 2-ethyl-2-cyano-3,3-diphenyl acrylate; (2-ethylhexyl)-2-cyano-3,3-diphenyl acrylate; 2-(2'-hydroxy-4'-methylphenyl)benzotriazole, sold by Ciba-Geigy Corp. under the trademark Tinuvin P; 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); 2,4-dihydroxybenzophenone; 2-hydroxy-4-methoxybenzophenone; and 2-ethyl-2'-ethoxyalanilide. Illustrative reducing compounds may include hydroquinones such as, but not limited to, tetramethylhydroquinone.

In one embodiment, the electrochromic medium further includes an anodic and/or cathodic color-stabilizing redox buffer. Suitable redox buffers include, among others, those disclosed in U.S. Pat. No. 6,188,505. Other examples of suitable anodic and cathodic redox buffers include, but are not limited to, metallocene (e.g., substituted ferrocenes), and metallocinium (e.g. ferrocinium) compounds.

In one embodiment, the electrochromic medium may further include a cross-linked polymer matrix, a free-standing gel, and/or a substantially non-weeping gel.

Figure 2:
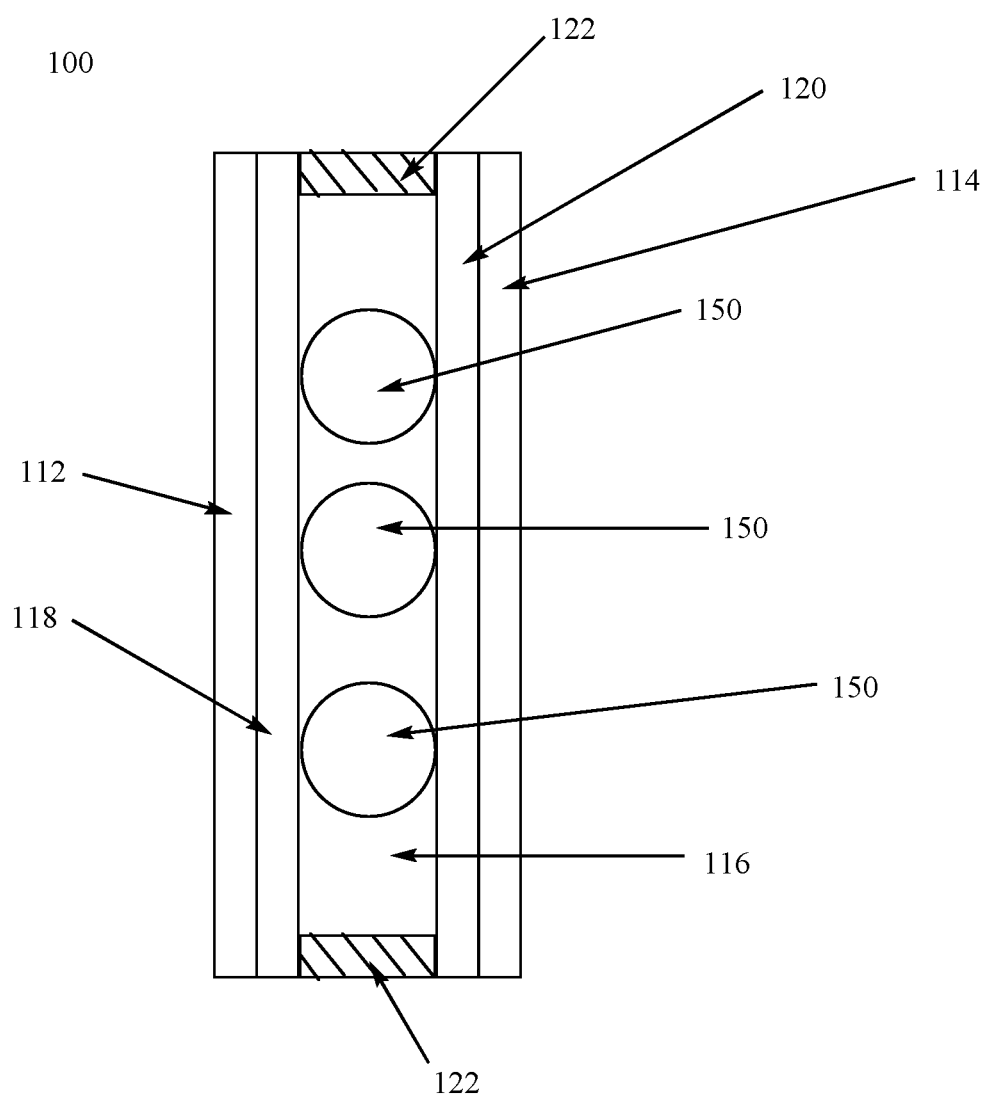
FIG. 2 is a cross-sectional schematic representation of an electrochromic device, not drawn to scale, illustrating the insoluble spacing objects, according to various embodiments.
Figure 3:
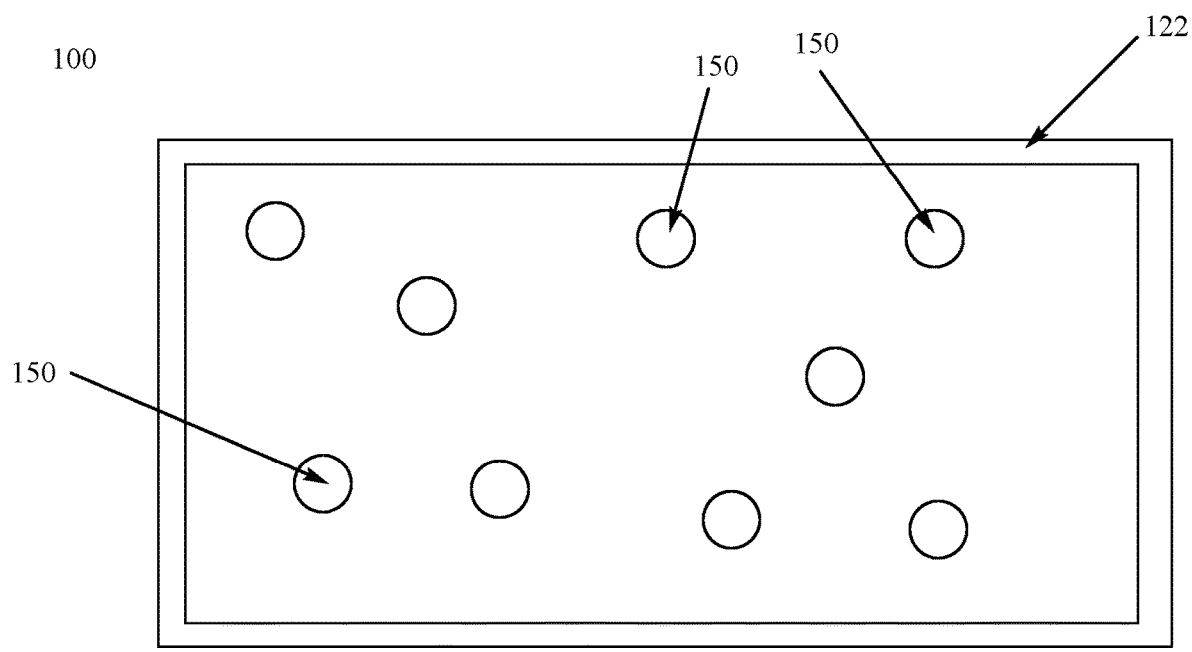
FIG. 3 is a frontal schematic representation of an electrochromic device, not drawn to scale, illustrating the insoluble spacing objects, according to various embodiments.

Schematic representations of an electrochromic device are shown in FIGS. 1-3. The electrochromic device 100 includes first substrate 112 having a first surface 112B and a second surface 112A and, and a second substrate 114 having a first surface 114A and a second surface 114B. The second surface 112A and the first surface 114A have associated therewith conductive surfaces 118 and 120, respectively, conductive surfaces 118 and 120 being separated by a distance, d. The first substrate 112 and the second substrate 114, along with a sealing member 122 define a chamber 116 for containing an electrochromic medium 124. The device also includes one or more plugs 126 and 130 associated with one or more fill ports 128. Alternatively, the plugs and fill ports may be through sealing member 122 instead of substrate 112 or substrate 114. The one or more fill ports 128 may be disposed within the first substrate 112, the second substrate 114, or the sealing member 122. Upon mounting as a mirror, window, or other device, the electrochromic device 100 may optionally include a bezel that extends around a periphery of at least one of the first substrate 112 and the second substrate 114 to conceal and/or protect a bus connector (if present), the sealing member 122, one or more plugs 126 and 130, and the one or more fill ports 128. Insoluble spacing objects 150 are shown in the illustrative device from a side-view/crossectional representation (FIG. 2) and a frontal representation (FIG. 3).

Several other electrochromic device configurations are contemplated for use, including, but not limited to, those disclosed in U.S. Pat. Nos. 5,818,625; 6,597,489; and 6,700,692, all of which are hereby incorporated herein by reference to the extent the descriptions therein do not conflict with the embodiments set forth herein.

In some embodiments, the first substrate may be fabricated from any one of a number of materials that are transparent or substantially transparent in the visible region of the electromagnetic spectrum, such as, for example, borosilicate glass, soda lime glass, natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, as well as Topas®. In another embodiment, the first substrate is fabricated from a sheet of glass having a thickness ranging from about 0.001 millimeters (mm) to about 12.7 mm. This may include any range of thickness such as from about 0.01 mm to about 1.50 mm, or from about 0.03 mm to about 1.00 mm. Of course, the thickness of the substrate will depend upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun. It will be further understood that first substrate and/or second substrate may comprise a UV absorbing layer and/or contain a UV absorbing material to help protect the substrate(s) and/or the electrochromic media from UV damage.

In some embodiments, the second substrate may be fabricated from similar materials as that of the first substrate, however, the conductive coating on the substrate need not be transparent. For example, the coating may be transparent, transflective, or reflective. As used herein, "transflective" describes a material or component that has a useful non-zero level of transmittance and also has a useful, non-zero level of reflectance in a specified spectral region. In the context of an image-forming reflector, such as a mirror for viewing reflected images, for example, the viewer in front of the mirror may not only observe an image of the ambient objects, formed in reflection from such transflective area but also receive information contained in the displayed image delivered with light from the light source located behind the transflective area of the mirror. In some embodiments, where transparency of the second substrate is not desired, the second substrate may be a metal. The second substrate may be fabricated from a sheet of glass, metal, or plastic having a thickness ranging from about 0.001 mm to about 12.7 mm. This may include thicknesses from about 0.03 mm to about 1.50 mm, or from about 0.65 mm to about 1.00 mm. If the first and second substrates are fabricated from sheets of glass, then the glass can, optionally, be tempered, heat strengthened, chemically strengthened, and/or laminated prior to or subsequent to being coated with layers of electrically conductive material.

One or more layers of electrically conductive material may be associated with the rear surface of the first substrate. These layers serve as an electrode for the electrochromic device. Electrically conductive material is desirably a material that: (a) is substantially transparent in the visible region of the electromagnetic spectrum; (b) bonds reasonably well to the first substrate; (c) maintains this bond when associated with a sealing member; (d) is generally resistant to corrosion from materials contained within the electrochromic device or the atmosphere; and (e) exhibits minimal diffuse or specular reflectance as well as sufficient electrical conductance. It is contemplated that the electrically conductive material may be fabricated from fluorine doped tin oxide (FTO), for example TEC glass, indium/tin oxide (ITO), doped zinc oxide, indium zinc oxide, metal oxide/metal/metal oxide (wherein metal oxide can be substituted with metal carbide, metal nitride, metal sulfide, etc.), or other materials known to those having ordinary skill in the art.

One or more layers of an electrically conductive material made of the same or different materials as those associated with the rear surface of the first substrate may be associated the front surface of the second substrate. The electrically conductive material may be operatively bonded to electrically conductive material associate with the first substrate by a sealing member. Once bonded, the sealing member, plug and/or the juxtaposed portions of electrically conductive materials may serve to generally define an inner peripheral geometry of a chamber. Alternatively, edge sealing techniques may be utilized which are disclosed in U.S. Pat. No. 7,372,611.

In some embodiments, the first substantially transparent substrate and second substantially transparent substrate have a cell distance of less than 65 μm. In another embodiment, the first substantially transparent substrate and second substantially transparent substrate have a cell distance of about 5 μm to about 65 μm, about 10 μm to about 65 μm, about 5 μm to about 55 μm, or ranges between any two of these values (including endpoints). In another embodiment, the first substantially transparent substrate and second substantially transparent substrate have a cell distance of about 1 μm to about 50 μm, in 0.2 μm increments.

In some embodiments, the sealing member may include any material that is configured to adhesively bond to the electrically conductive materials coated on the first and second substrate to, in turn, seal a chamber, (in certain embodiments in cooperation with a plug and fill port so that electrochromic composition does not inadvertently leak out of the chamber. It is also contemplated that the sealing member extends all the way to rear surface and front surface of their respective substrates. In such an embodiment, the layers of electrically conductive material coated on the first and second substrates may be partially removed where the sealing member is positioned. If the electrically conductive materials are not associated with their respective substrates, then the sealing member preferably bonds well to glass. It will be understood that sealing member can be fabricated from any one of a number of materials including, for example, those disclosed in U.S. Pat. Nos. 4,297,401; 4,418,102; 4,695,490; 5,596,023; 5,596,024; 6,157,480; and 6,714,334.

The concentration of the electrochromic materials in the medium may also be modified. As the cell spacing decreases, higher concentrations may be used to maintain or increase coloration of the device. In some embodiments, the concentration of the anodic and/or cathodic materials in the electrochromic medium may be from about 1 millimolar (mM) to about 500 mM. In some embodiments, the concentration of the anodic and/or cathodic materials in the electrochromic medium may be from about 2 mM to about 100 mM.

In one embodiment, at least one of the anodic electroactive materials has a concentration of at least 2 mM. In another embodiment, at least one of the anodic electroactive materials has a concentration of about 2 mM to about 100 mM, about 3 mM to about 70 mM, about 3 mM to about 60 mM, or ranges between any two of these values (including endpoints). In another embodiment, at least one of the anodic electroactive materials has a concentration of about 2 mM to about 8 mM. In another embodiment, a second anodic electroactive material has a concentration of about 40 mM to about 70 mM.

In one embodiment, at least one of the cathodic electroactive materials has a concentration of at least 50 mM. In another embodiment, at least one of the cathodic electroactive materials has a concentration of about 50 mM to about 100 mM, about 60 to about 90 mM, about 70 mM to about 80 mM, or ranges between any two of these values (including endpoints).

Illustrative electrochromic devices employing the electrochromic compounds described herein may include, for illustrative purposes only, a window, an aircraft transparency, a mirror, an electromagnetic filter, a display device, and the like. it will be understood that like or analogous elements and/or components, and/or methods referred to herein, may be identified throughout the drawings with like reference characters. In some embodiments, the electrochromic device is an electrochromic window or an electrochromic mirror. In some embodiments, the device is a vehicular interior electrochromic mirror. In some embodiments, the device is a variable transmission electrochromic window. In some embodiments, the device is an aircraft window system. Other applications of the electrochromic device includes screens for watches, calculators and computer display screens; eye wear such as eyeglasses and sunglasses; switchable mirrors, sun visors; automobile, architectural, aircraft, marine, and spacecraft windows; information display boards and digital billboards and the like.

EQUIVALENTS

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochromic device comprising:
a chamber defined by a substantially transparent first substrate, a second substrate, and a sealing member; and an electrochromic medium disposed within the chamber, the medium comprising a cathodic compound, an anodic compound, a hydroquinone, and a solvent;

wherein:

the cathodic compound is represented by Formula (I):

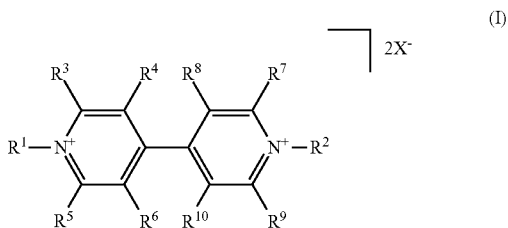

(I)

$R_1$ and $R^2$ are individually unsubstituted alkyl, substituted or unsubstituted siloxyalkyl, substituted or unsubstituted hydroxyalkyl, substituted or unsubstituted alkenyl, or substituted or unsubstituted aralkyl;

$R^4$, $R^6$, $R^8$, and $R^{10}$ are individually H, $OR^{20}$, F, Cl, Br, I, CN, $NO_2$, alkyl, or aryl;

$R^3$ and $R^5$ are individually secondary alkyl, tertiary alkyl, or a group of Formula (II):

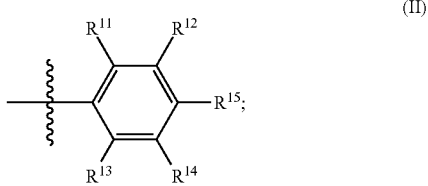

(II)

$R^{11}$, $R^{12}$, $R^{13}$, and $R^{14}$ are individually H, $OR^{20}$, F, Cl, Br, I, CN, $NO_2$, or alkyl;

$R^{15}$ is OH, F, Cl, Br, I, CN, $NO_2$, —$OC(O)NR^{16}R^{17}$, ethyl, n-propyl, iso-propyl, butyl, sec-butyl, tert-butyl, alkoxy, or $OC(O)NH(CH_2)_nCOOH$;

$R^{16}$ is H or alkyl; and $R^{17}$ is H, methyl, ethyl, n-propyl, iso-propyl, butyl, sec-butyl, tert-butyl, or —$(CH_2)_nSi(OR^{18})_3$;

$R^{18}$ is H or alkyl; and n is 1 to 10;

$R^7$ and $R^9$ are H;

$R^{20}$ is H or alkyl; and

X is an anion.

2. The electrochromic device of claim 1, wherein the hydroquinone is tetramethylhydroquinone.

3. The electrochromic device of claim 1, wherein:

the first substrate comprises a first surface, and a second surface comprising a first substantially transparent, electrically conductive coating and disposed opposite to the first surface;

the second substrate comprising a first surface comprising an electrically conductive coating, and a second surface disposed opposite to the first surface;

the second surface of the first substrate and the first surface of the second substrate being located proximally to each other and having a substantially uniform spacing of distance, d, between them.

4. The electrochromic device of claim 3, wherein 0 µm<d≤65 µm.

5. The electrochromic device of claim 3, wherein 5 µm<d≤40 µm.

6. The electrochromic device of claim 3, wherein 10 µm<d≤35 µm.

7. The electrochromic device of claim 3, wherein 30 µm<d≤40 µm.

8. The electrochromic device of claim 3 further comprising insoluble spacing objects within the chamber, the insoluble spacing objects having a largest dimension that is greater than 0 µm, but less than or equal to d.

9. The electrochromic device of claim 8, wherein the insoluble spacing objects comprise a colorless material, a transparent material, or a colorless and transparent material.

10. The electrochromic device of claim 8, wherein the insoluble spacing objects comprise a ceramic or a polymer.

11. The electrochromic device of claim 8, wherein the insoluble spacing objects comprise glass or a metal oxide.

12. The electrochromic device of claim 8, wherein a refractive index of the spacing objects and a refractive index of the electrochromic medium differ by no more than 20%.

13. The electrochromic device of claim 12, wherein a refractive index of the spacing objects and a refractive index of the electrochromic medium differ by less than 5%.

14. The electrochromic device of claim 1, wherein the cathodic compound, the anodic compound, or both the cathodic and the anodic compound exhibit a low diffusion coefficient.

15. The electrochromic device of claim 14, wherein low diffusion coefficient is from about $1\times10^{-6}$ to about $4\times10^{-6}$ cm$^2$/second.

16. The electrochromic device of claim 15, wherein low diffusion coefficient is from about $1\times10^{-6}$ to about $2\times10^{-6}$ cm$^2$/second.

17. The electrochromic device of claim 1, wherein the anodic compound comprises a metallocene, a 5,10-dihydrophenazine, a phenothiazine, a phenoxazine, a carbazole, a triphenodithiazine, or a triphendioxazine.

18. The electrochromic device of claim 1, wherein $R^3$ and $R^5$ are each a group of Formula (II) and $R^{15}$ is —$OC(O)NR^{16}R^{17}$.

19. The electrochromic device of claim 1, wherein $R^3$ and $R^5$ are individually a group of Formula (II), and $R^{15}$ is $OC(O)NH(CH_2)_nSi(OEt)_3$.

20. The electrochromic device of claim 1, wherein $R^3$ and $R^5$ are each a group of Formula (II) and $R^{15}$ is $OC(O)NH(CH_2)_nSi(OEt)_3$.

* * * * *